(12) United States Patent
Guo et al.

(10) Patent No.: US 8,211,396 B1
(45) Date of Patent: Jul. 3, 2012

(54) HETEROCYCLIC SEMICONDUCTOR PRECURSOR COMPOUNDS, COMPOSITIONS CONTAINING THE SAME, AND METHODS OF MAKING SUCH COMPOUNDS AND COMPOSITIONS

(75) Inventors: Wenzhuo Guo, Cupertino, CA (US); Fabio Zürcher, Brisbane, CA (US); Joerg Rockenberger, Redwood City, CA (US); Klaus Kunze, Albuquerque, NM (US); Vladimir K. Dioumaev, Mountain View, CA (US); Brent Ridley, San Carlos, CA (US); James Montague Cleeves, Redwood City, CA (US)

(73) Assignee: Kovio, Inc., San Jose, CA (US)

( * ) Notice: Subject to any disclaimer, the term of this patent is extended or adjusted under 35 U.S.C. 154(b) by 1141 days.

(21) Appl. No.: 10/950,373

(22) Filed: Sep. 24, 2004

(51) Int. Cl.
*C01B 33/00* (2006.01)
(52) U.S. Cl. ........................................ 423/324
(58) Field of Classification Search .................. 423/324
See application file for complete search history.

(56) References Cited

U.S. PATENT DOCUMENTS

| | | | |
|---|---|---|---|
| 4,554,180 A | 11/1985 | Hirooka | |
| 4,683,145 A | 7/1987 | Nishimura et al. | |
| 4,683,146 A | 7/1987 | Hirai et al. | |
| 4,726,963 A | 2/1988 | Ishihara et al. | |
| 4,830,890 A | 5/1989 | Kanai | |
| 4,841,083 A | 6/1989 | Nagai et al. | |
| 5,866,471 A | 2/1999 | Beppu et al. | |
| 6,517,911 B1 | 2/2003 | Matsuki | |
| 6,518,087 B1 | 2/2003 | Furusawa et al. | |
| 6,527,847 B1 | 3/2003 | Matsuki | |
| 6,541,354 B1* | 4/2003 | Shimoda et al. | 438/478 |
| 6,767,775 B1 | 7/2004 | Yudasaka et al. | |
| 6,884,700 B2 | 4/2005 | Aoki et al. | |
| 7,071,125 B2 | 7/2006 | McSwiney et al. | |
| 7,498,015 B1* | 3/2009 | Kunze et al. | 423/645 |
| 2003/0045632 A1 | 3/2003 | Shiho et al. | |
| 2003/0229190 A1 | 12/2003 | Aoki et al. | |
| 2005/0176183 A1 | 8/2005 | Aoki et al. | |

FOREIGN PATENT DOCUMENTS

| | | |
|---|---|---|
| GB | 2077710 B | 10/1983 |
| JP | 60-242612 | 12/1985 |
| JP | 6-191821 | 7/1994 |
| JP | 7-267621 | 10/1995 |
| JP | 9-045922 | 2/1997 |
| JP | 10-195985 | 1/2000 |
| WO | WO 00/59041 | 10/2000 |

OTHER PUBLICATIONS

CAS Accession No. 1978:597656, 1978.*
Kudo et al. "Ab Initio Study of the Effect of Heteroatoms and Bulky Substituents on the Strain Energies of Cyclosilanes" Organometallics, 2003, vol. 22, pp. 4721-4724.*
Gollner et al. "Linear and Cyclic Polysilanes Containing the Bis(trimethylsilyl)amino Group: Synthesis, Reactions, and Spectroscopic Characterization" Inorganic Chemistry, 2003, vol. 42, pp. 4579-4584.*
Yutaka Kitsuno et al.; Method for forming poly crystal silicon film; Patent Abstracts of Japan; Feb. 14, 1997; Publication No. JP09045922 A; Japanese Intellectual Property Office, Japan.
Kotaro Yano et al.; Formation of silicon membrane; Patent Abstracts of Japan; Oct. 17, 1995; Publication No. JP07267621 A; Japanese Intellectual Property Office, Japan.
Kotaro Yano et al.; Higher order silane containing solution for forming silicon film; Patent Abstracts of Japan; Jul. 12, 1994; Publication No. JP06191821 A; Japanese Intellectual Property Office, Japan.
Yukio Nishimura et al.; Deposition film forming method; Patent Abstracts of Japan; Dec. 2, 1985; Publication No. JP60242612 A; Japanese Intellectual Property Office, Japan.
Uwe Herzog & Robert West; Heterosubstituted Polysilanes (5 Pages); Macromolecules 1999, 32, 2210-2214; American Chemical Society, Mar. 9, 1999.
Inventors: Takadera Tsutomu, Fukuyama Keiichi, Sakawaki Akira, Yano Kotaro & Kitsuno Yutaka; Method for Forming Silicon Film and Manufacture of Solar Battery; Publication No. 2000031066; Patent Abstracts of Japan; Publication Date: Jan. 28, 2000; Applicant: Sharp Corp, Showa Denko KK.

* cited by examiner

*Primary Examiner* — Joseph Kosack
(74) *Attorney, Agent, or Firm* — The Law Offices of Andrew D. Fortney, Ph.D., P.C.; Andrew D. Fortney; William K. Nelson

(57) ABSTRACT

Heterocyclosilane compounds and methods for making the same. Such compounds (and/or ink compositions containing the same) are useful for printing or spin coating a doped silane film onto a substrate that can easily be converted into a doped amorphous silicon film (that may also be hydrogenated to some extent) or doped polycrystalline semiconductor film suitable for electronic devices. Thus, the present invention advantageously provides commercial qualities and quantities of doped semiconductor films from a "doped liquid silicon" composition.

60 Claims, 1 Drawing Sheet

HETEROCYCLIC SEMICONDUCTOR PRECURSOR COMPOUNDS, COMPOSITIONS CONTAINING THE SAME, AND METHODS OF MAKING SUCH COMPOUNDS AND COMPOSITIONS

FIELD OF THE INVENTION

The present invention generally relates to the field of heterocyclic semiconductor precursor compounds, compositions containing such compounds, intermediates useful for synthesizing such compounds, methods for the synthesis of such compounds and intermediates, and methods of making such compositions. More specifically, embodiments of the present invention pertain to heterocyclosilane compounds of the formula $(AH_z)_n(DR^1)_m$, doped semiconductor precursor inks containing such compounds, intermediates for making such heterocyclosilane compounds, and methods of making such compounds, intermediates and inks.

DISCUSSION OF THE BACKGROUND

There are a number of silanes that are liquid at ambient temperatures (e.g., from about 15° C. to about 30° C.) or that can be formulated into an ink composition that is liquid at ambient temperatures. Liquid silanes, such as cyclopentasilane or cyclohexasilane, have been investigated as candidate "liquid silicon" precursors. However, to date, it has been challenging to make semiconducting thin films of commercial qualities and quantities from "liquid silicon" precursors. One such challenge has related to doping such "liquid silicon" precursors and/or the films formed therefrom.

Methods have been proposed for covalently binding dopant atoms such as phosphorous and boron to silicon atoms in certain liquid (cyclo)silanes. For example, photochemical reactions between (cyclo)silanes and certain phosphines and/or boranes are disclosed in U.S. Pat. No. 4,683,145 and U.S. Patent Publication No. 2003/0229190. Heterocyclic doped silanes are disclosed in U.S. Pat. No. 6,527,847 and U.S. Patent Publication No. 2003/0045632, and a method for synthesizing such doped silanes is disclosed in U.S. Pat. No. 6,527,847. The properties of thin films formed from such compounds are somewhat disappointing, given the relative proportion of dopant atoms in the film-forming mixture. Also, the results are not quite as reproducible as may be generally desired for commercial applications.

The mechanisms behind the disappointing results are not well understood. However, there may be a number of critical steps involved in forming doped semiconducting films from doped liquid silanes, such as forming the covalent bonds between dopant atoms and silicon, preserving these covalent bonds during subsequent synthesis steps and in initial processing steps to form a thin film or thin film structure, and activating the dopant atoms once the thin film or thin film structure is formed.

Thus, there has been a long-felt need in the art for a "liquid silicon" compound and/or composition, particularly a doped "liquid silicon." Such a composition would primarily comprise silicon atoms (other than solvent, to the extent any solvent may be present as a main component), would include a dopant or dopant precursor, would be liquid at ambient temperatures (to facilitate handling, deposition and further processing), and would yield commercial quality doped semiconducting films upon subsequent processing (e.g., annealing or curing). However, to date, methods of making a thin doped semiconducting film or film structure from doped liquid silanes (or liquid compositions comprising doped silanes) have not been sufficiently reliable for high-volume commercial use.

SUMMARY OF THE INVENTION

Embodiments of the present invention relate to novel heterocyclosilane compounds of the formula $(AH_z)_n(DR^1)_m$, where n is from 2 to 12, m is 1 or 2, each of the n instances of A is independently Si or Ge, each of the n instances of z is independently 1 or 2, each of the m instances of D is Sb, As, P or B, and each of the m instances of $R^1$ is alkyl, aryl, aralkyl, or $AR^2_3$, where $R^2$ is hydrogen, alkyl, aryl, aralkyl, or $A_yH_{2y+1}$ (where y is an integer of 1 to 4); to compositions containing such compounds; and to methods of synthesizing such compounds. The compounds and compositions are generally useful for making (e.g., by printing or spin-coating) doped silane and/or semiconductor thin films (see, e.g., copending U.S. patent application Ser. No. 10/949,013, filed concurrently herewith). Thus, the present invention advantageously provides a means for obtaining commercial qualities and quantities of thin doped semiconductor films from a "doped liquid silicon" composition.

The invention further relates to novel heterocyclosilane compounds of the formula $(AR^5_z)_n(DR^1)_m$, where n is from 2 to 12, m is 1 or 2, each of the n instances of A is independently Si or Ge, each of the n instances of z is independently 1 or 2, each of the n*z (i.e., n times z) instances of $R^5$ is independently aryl, alkyl or aralkyl (and where z is 2, one $R^5$ group for each A may be hydrogen), each of the m instances of D is Sb, As, P or B, and each of the m instances of $R^1$ is alkyl, aryl, aralkyl, or $AR^2_3$, where $R^2$ is hydrogen, alkyl, aryl, aralkyl, or $A_yH_{2y+1}$ (where y is an integer of 1 to 4); and to methods of synthesizing such compounds. Such compounds are useful in the synthesis of doped heterocyclosilane compounds of the formula $(AH_z)_n(DR^1)_m$, described herein. These and other advantages of the present invention will become readily apparent from the detailed description of preferred embodiments below.

DETAILED DESCRIPTION OF THE PREFERRED EMBODIMENTS

Figure 1A:
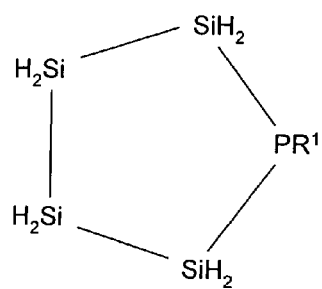
FIGS. 1A-1F show representative compounds of the formula $(AH_z)_n(DR^1)_m$, in accordance with various embodiments of the present invention.
Figure 1B:
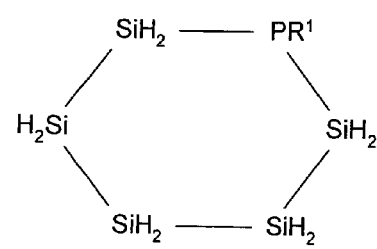

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "$C_a$-$C_b$ alkyl," "$C_a$-$C_b$ alkoxy," etc., shall refer to both branched and unbranched moieties, to the extent the range from a to b covers 3 or more carbon atoms. Unless otherwise indicated, the terms "arene," "aryl," and "ar-" refer to both mono- and polycyclic aromatic species, to the extent possible and/or applicable. The terms "silane" and "(cyclo)silane" may be used interchangeably herein, and unless expressly indicated otherwise, these terms refer to compounds or mixtures of compounds that consist essentially of (1) silicon and/or germanium and (2) hydrogen. The terms "heterosilane" and "hetero(cyclo)silane" may be used interchangeably herein, and unless expressly indicated otherwise, these terms refer to compounds or mixtures of compounds that consist essentially of (1) silicon and/or germanium, (2) hydrogen, and (3) a dopant atom such as B, P, As or Sb that may be substituted by a conventional hydrocarbon, silane or germane substituent. The prefix "(cyclo)-" generally refers to a compound or mixture of compounds that may contain a cyclic ring, and the prefix "cyclo-" generally refers to a compound or mixture of compounds that contain one or more cyclic rings. For the sake of briefness, the terms "halo-," "halide" and grammatical derivations thereof may describe halogens as defined in the Periodic Table of Elements (F, Cl, Br, and I) and halogen-like species (e.g., that form stable monovalent anions) such as methanesulfonate (OMs), trifluoromethanesulfonate (OTf), toluenesulfonate (OTs), etc. Also, the terms "isolating" and "purifying" (and grammatical variations thereof) may be used interchangeably herein, but these terms are intended to have their art-recognized meanings, unless expressly indicated otherwise.

The present invention concerns a heterocyclosilane compound of the formula $(AH_z)_n(DR^1)_m$, compositions containing the same, and methods of making the same. In the present heterocyclosilane compound, n is generally from 2 to 12, m is 1 or 2, each of the n instances of A is independently Si or Ge, each of the m instances of D is P, As, Sb or B, and $R^1$ is alkyl, aryl, aralkyl or $AR^2_3$, where $R^2$ is hydrogen, alkyl, aryl, aralkyl, or $A_yH_{2y+1}$ (where y is from 1 to 4; e.g., $SiH_3$). The composition generally comprises the present heterocyclosilane and a solvent in which the heterocyclosilane is soluble. The method of making the present heterocyclosilane generally comprises the steps of: (a) reacting a heterocyclosilane precursor with (i) a halogen source (e.g., $HX^1$ or $R^3(C=O)X^1$, where $X^1$ is a halogen and $R^3$ is alkyl, aryl, aralkyl, or hydrogen) and a Lewis acid, or (ii) trifluoromethanesulfonic acid (HOTf) to form a haloheterocyclosilane; and (b) reducing the haloheterocyclosilane with a metal hydride to form the heterocyclosilane. The method of making the composition generally comprises combining the heterocyclosilane with a solvent, and mixing the heterocyclosilane and the solvent sufficiently to dissolve the heterocyclosilane in the solvent.

A further aspect of the invention concerns a heterocyclosilane precursor of the formula $(AR_z)_n(DR^1)_m$, where n is from 2 to 12, m is 1 or 2, each of the n instances of A is independently Si or Ge, each of the n instances of z is independently 1 or 2, each of the n*z instances of R is aryl, alkyl or aralkyl (and for each A where z is 2, one R group may be hydrogen), each of the m instances of D is Sb, As, P or B, and each of the m instances of $R^1$ is alkyl, aryl, aralkyl, or $AR^2_3$, where $R^2$ is hydrogen, alkyl, aryl, aralkyl, or $A_yH_{2y+1}$ (where y is an integer of 1 to 4), and a method of making the same. The invention, in its various aspects, will be explained in greater detail below with regard to exemplary embodiments.

Exemplary Heterocyclosilane Compounds

The present invention primarily relates to heterocyclosilane compounds of the formula $(AH_z)_n(DR^1)_m$, where n is from 2 to 12, m is 1 or 2, each of the n instances of A is independently Si or Ge, each of the n instances of z is independently 1 or 2, each of the m instances of D is Sb, As, P or B, and each of the m instances of $R^1$ is alkyl, aryl, aralkyl, or $AR^2_3$, where $R^2$ is hydrogen, alkyl, aryl, aralkyl, or $A_yH_{2y+1}$ (where y is an integer of 1 to 4). In certain preferred embodiments, A is Si, z is 2, n is (predominantly) 4, and/or m is 1, although other embodiments may be preferred under certain circumstances.

For example, one or more of the n instances of A may be Ge, in which case the present heterocyclosilane compounds may comprise heterocyclosilagermane compounds having the formula $(SiH_z)_{n-i}(GeH_z)_i(DR^1)_m$, where i is an integer of at least 1 but less than n. Depending on the choice of starting materials and the method of synthesis (as is discussed below), the present compounds may comprise a somewhat statistical mixture of heterocyclosilane compounds and heterocyclosilagermane compounds (e.g., in which there is a statistical distribution of compounds with specific i, n and m values).

Figure 1C:
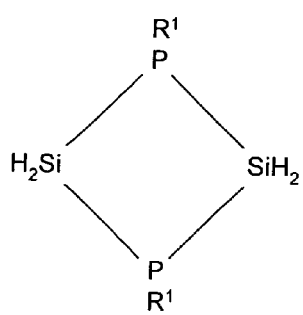
Figure 1D:
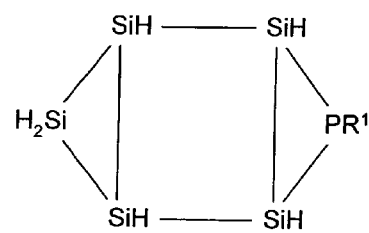
Figure 1E:
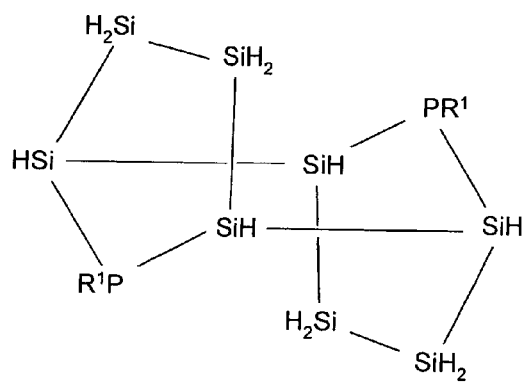
Figure 1F:
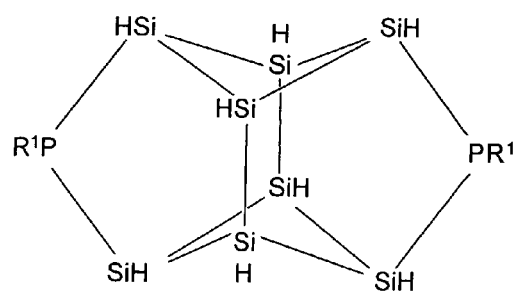

Furthermore, in preferred embodiments, $3 \leq n \leq 10$ and $4 \leq n+m \leq 12$, and more preferably, $3 \leq n \leq 6$ and $5 \leq n+m \leq 7$. FIGS. 1A-1D show various heterocyclosilane compounds in which $4 \leq n+m \leq 8$. FIG. 1C shows such a heterocyclosilane compound in which both n and m=2, and FIG. 1D shows such a heterocyclosilane compound in which z can be 1 or 2 (as does FIG. 1E). Typically, n+m=5 (see FIG. 1A). Generally, when $n+m \leq 5$, the present heterocyclosilane compounds are monocyclic (see FIGS. 1A and 1C); when $6 \leq n+m \leq 8$, the present heterocyclosilane compounds may be monocyclic (see FIG. 1B) or polycyclic (see FIG. 1D); and when $n+m \geq 9$, the present heterocyclosilane compounds are generally polycyclic (see FIGS. 1E-1F).

One distinguishing feature of the present heterocyclosilane compounds is the $R^1$ group covalently bound to the dopant atom D. For example, $R^1$ may be $C_1$-$C_6$ alkyl (e.g., methyl, ethyl, propyl, isopropyl, n-butyl, t-butyl, n-hexyl or t-hexyl [3',3'-dimethylbutyl]), $C_6$-$C_{12}$ aryl (e.g., phenyl, α- or β-naphthyl, tolyl [o-, m- or p-methylphenyl], xylyl [e.g., 1,4-dimethylphenyl], cymyl [o-, m- or p-methylisopropylphenyl], t-butylphenyl, etc.), $C_7$-$C_{12}$ aralkyl (e.g., benzyl, 1,5-dimethylbenzyl, α,α-dimethylbenzyl, etc.), $SiH_3$, or $Si(SiH_3)_3$ (i.e., y=1), although when $R^1$ is $AR^2_3$, $R^2$ can be hydrogen, $C_1$-$C_6$ alkyl, $C_6$-$C_{12}$ aryl or $C_7$-$C_{12}$ aralkyl as described above. In certain implementations, $R^1$ is t-butyl or phenyl.

In theory, dopant atom D may be any conventional dopant atom used in the semiconductor field. In practice, however, D is generally P, As, Sb or B (preferably P or B). One characteristic of a thin semiconducting film made from the present heterocyclosilane compounds is that the dopant is uniformly distributed throughout the thin film (see, e.g., copending U.S. patent application Ser. No. 10/949,013, filed concurrently herewith and the relevant portions of which are incorporated herein by reference). Surprisingly, the presence of a carbon-containing substituent on the dopant atom does not result in a significant increase in the amount of carbon in doped semiconductor films formed from the present heterocyclosilane compounds, or in significant adverse effects on the electrical, physical, and/or structural properties of such films, relative to undoped films formed from structurally analogous cyclosilanes (e.g., cyclopentasilane).

Exemplary Heterocyclosilane Compositions and Methods of Making the Same

The invention further relates to compositions comprising the present heterocyclosilane compound(s) and a solvent in which the heterocyclosilane is soluble. Thus, preferred compositions include those that contain one or more preferred heterocyclosilane compounds (e.g., where A is Si, z is 2, n is 4, m is 1, D is P or B, and/or $R^1$ is $C_1$-$C_6$ alkyl, $C_6$-$C_{12}$ aryl, $C_7$-$C_{12}$ aralkyl, $SiH_3$, or $Si(SiH_3)_3$ [particularly where $R^1$ is t-butyl or phenyl]).

The solvent in the present composition is one that is generally easily and/or thoroughly removable from the composition. Thus, in one embodiment, the solvent is selected from the group consisting of alkanes, substituted alkanes, cycloalkanes, substituted cycloalkanes, arenes, substituted arenes, and (cyclic) siloxanes, preferably those having a boiling point at 1 atm pressure of <250° C., ≦200° C., or ≦150° C.

While other apolar and/or non-polar solvents (e.g., saturated hydrocarbons such as $C_5$-$C_{12}$ alkanes, aliphatic ethers such as di-$C_2$-$C_6$ alkyl ethers, methyl $C_4$-$C_6$ alkyl ethers and di-$C_1$-$C_4$ alkyl $C_2$-$C_6$ alkylene diethers [e.g., glyme], cyclic ethers such as tetrahydrofuran and dioxane, (cyclo)siloxanes, arenes such as benzene, toluene and xylenes, etc.) may be included in the present composition, mono- or polycycloalkanes, (cyclic) siloxanes and fluoroalkanes are generally preferred for their removability from the composition. The (cyclic) siloxane solvents are generally those that are liquid at ambient temperatures (e.g., 15-30° C.). Thus, the solvent may be selected from the group consisting of $C_5$-$C_{12}$ or $C_6$-$C_{10}$ alkanes; $C_1$-$C_6$ alkanes substituted with from 1 to 2n halogen (e.g., 1 to 4 chlorine substituents) or from 1 to n (e.g., 1 or 2) $C_1$-$C_4$ alkoxy substituents; $C_6$-$C_{12}$ monocycloalkanes; $C_3$-$C_8$ monocycloalkanes substituted with from 1 to 2n $C_1$-$C_4$ alkyl or halogen substituents (e.g., 1 or 2 $C_1$-$C_4$ alkyl or chlorine substituents, or 2n fluorine substituents) or from 1 to n $C_1$-$C_4$ alkoxy substituents (e.g., 1 $C_1$-$C_4$ alkoxy substituent), where n is the number of carbon atoms in the monocycloalkane ring; $C_{10}$-$C_{14}$ polycycloalkanes and partially hydrogenated polycycloarenes (e.g., decalin, tetralin); siloxanes of the formula $(R^4_3Si)(OSiR^4_2)_p(OSiR^4_3)$ and cyclosiloxanes of the formula $(SiR^4_2O)_q$, where p is from 0 to 4, q is from 2 to 6 (preferably from 3 to 5), each $R^4$ is independently H, $C_1$-$C_6$ alkyl, benzyl or phenyl substituted with from 0 to 3 $C_1$-$C_4$ alkyl groups (preferably each $R^4$ is methyl); and $C_3$-$C_8$ fluoroalkanes substituted with from 1 to (2m+2) fluorine atoms and that are liquid at ambient temperatures, where m is the number of carbon atoms in the fluoroalkane. Preferably, the solvent is a $C_6$-$C_{12}$ mono- or bicycloalkane (e.g., cyclohexane, cycloheptane, cyclooctane, decalin, etc.). Somewhat surprisingly, mono- and bicycloalkanes (e.g., monocyclooctane, decalin) provide ink formulations with improved stability relative to aromatic hydrocarbon solvents.

The composition may contain from 0.00001 to 50 vol %, from 0.0001 to 35 vol %, or from about 0.001 to 25 vol % of the heterocyclosilane compound. Conversely, from 0.00001 to 50 vol %, from 0.0001 to 35 vol %, or from about 0.0001 to 25 vol % of the composition may comprise or consist essentially of the heterocyclosilane compound. Alternatively, the composition may contain a sufficient percentage (by volume, mass/weight or atoms) of the heterocyclosilane compound (and, optionally, a [cyclo]silane) to result in a semiconductor film having from $10^{16}$ to $10^{21}$ atoms/cm$^3$ of dopant therein (see, e.g., the table below).

The composition may further comprise one or more conventional additives, such as a surface tension reducing agent, a surfactant, a binder and/or a thickening agent, generally in conventional amount(s) (e.g., from 0.001 to 10 wt. %). However, such additives are not at all necessary. As a result, the present composition may consist essentially of the heterocyclosilane compound, one or more cyclosilane compounds (e.g., as discussed immediately below), and the solvent. Alternatively, the present composition may consist essentially of the heterocyclosilane (optionally with one or more [cyclo]silane compounds), without the addition of a conventional carbon-containing or siloxane solvent.

The composition may thus further contain a cyclosilane compound of the formula $(A'H_x)_k$, where k is from 3 to 12, each of the k instances of x is 1 or 2, and each A' is independently Si or Ge (see, e.g., U.S. patent application Ser. No. 10/789,317, filed Feb. 27, 2004, the relevant portions of which are incorporated herein by reference). Typically, in various preferred cyclosilanes, A is Si, x is 2, and/or k is from 4 to 6. In further embodiments of the present composition, from 0.1 to 50 vol %, from 0.5 to 35 vol %, or from about 1 to 25 vol % of the composition consists essentially of the cyclosilane compound. Alternatively, from about 1 to 100 vol %, from 5 to 50 vol %, or from 10 to 35 vol % of the composition consists essentially of the heterocyclosilane compound and the cyclosilane compound. In this alternative embodiment, the volume ratio of heterocyclosilane compound to cyclosilane compound may be from about 1:100,000 to about 1:1. Thus, in one embodiment, the cyclosilane compound can serve as the solvent in the composition (at least when the cyclosilane compound is liquid at ambient temperatures).

Representative proportions (in vol. %) of heterocyclosilane (HCS) and cyclosilane (CSi) components in exemplary ink formulations having a certain total volume percentage of HCS and CSi components sufficient to result in a semiconductor film having a predetermined level of doping (in atoms/cm$^3$) are shown in the following table:

| Dopant concentr'3 n (atoms/cm$^3$) | 100% Silanes | | 20% Silanes | | 1% Silanes | |
|---|---|---|---|---|---|---|
| | HCS | CSi | HCS | CSi | HCS | CSi |
| $5 \cdot 10^{16}$ | 0.001% | 99.999% | 0.0002% | 19.9998% | 0.00001% | 0.99999% |
| $5 \cdot 10^{18}$ | 0.1% | 99.9% | 0.02% | 19.98% | 0.001% | 0.999% |
| $5 \cdot 10^{20}$ | 10% | 90% | 2% | 18% | 0.1% | 0.9% |
| $5 \cdot 10^{21}$ | 50% | 50% | 10% | 10% | 0.5% | 0.5% |

The values in the above table are representative for HCS components having a Si:dopant:C atom ratio of about 4:1:6 and CSi components having a CSi Si atom:HCS (Si+dopant) atom ratio of about 1:1, although components having similar atom ratios should give similar results.

The present invention further relates to a method of making the present composition, comprising the steps of combining the heterocyclosilane compound with the solvent (and/or a [cyclo]silane); and mixing the heterocyclosilane compound and the solvent and/or (cyclo)silane to form a solution. The solvent can be any of those mentioned above, but in preferred embodiments, the solvent consists essentially of a member selected from the group consisting of $C_6$-$C_{12}$ mono- or polycycloalkanes; $C_3$-$C_{10}$ mono- or polycycloalkanes substituted with from 1 to 2n $C_1$-$C_4$ alkyl or halogen substituents or from 1 to n $C_1$-$C_4$ alkoxy substituents, where n is the number of carbon atoms in the cycloalkane ring; and $C_3$-$C_8$ fluoroalkanes substituted with from 1 to (2m+2) fluorine atoms and that are liquid at ambient temperatures, where m is the number of carbon atoms in the fluoroalkane. Most preferably, the solvent consists essentially of a $C_6$-$C_{10}$ mono- or bicycloalkane (e.g., cyclooctane, decalin, etc.). However, in those embodiments where the composition contains a (cyclo)silane that is liquid at ambient temperatures in an amount equal to or greater than the heterocyclosilane compound, the (cyclo)silane may also be considered to be a solvent (particularly in the absence of a carbon-containing or siloxane-based solvent).

The method may further comprise combining a surface tension reducing agent, a surfactant, a binder, a thickening agent and/or the cyclosilane compound of the formula $(A'H_z)_k$ described herein with the solvent, generally in an amount as described herein.

In one implementation, the composition may be prepared by mixing about 10-25 vol. % of the heterocyclosilane with cyclooctane under an inert (e.g., argon) atmosphere. In one variation, the mixture may be stored in amber vials to prevent exposure to UV or other radiation. The composition consisting of liquid-phase components may be used directly to coat a substrate with a thin doped silane film and/or to form or print a doped silane or semiconductor thin film on a substrate.

Exemplary Methods of Making Heterocyclosilane Compounds

A further aspect of the present invention relates to a method of making a heterocyclosilane, comprising the steps of (a) reacting a heterocyclosilane precursor of the formula $(AR_z)_{n'}(DR^1)_{m'}$ with a halogen source and (optionally) a Lewis acid to form a haloheterocyclosilane, where n' is from 2 to 12, m' is 1 or 2, each of the n instances of A is independently Si or Ge, each of the n' instances of z is independently 1 or 2, each of the z*n' instances of R is independently aryl, alkyl or aralkyl (and for each A where z is 2, one R group may be hydrogen), each of the m' instances of D is Sb, As, P or B, and each of the m' instances of $R^1$ is alkyl, aryl, aralkyl, or $AR^2_3$ (where $R^2$ is hydrogen, alkyl, aryl, aralkyl, or $A_yH_{2y+1}$); and (b) reducing the haloheterocyclosilane with a metal hydride to form the heterocyclosilane. This aspect of the invention may be similarly distinguished by the presence of a hydrocarbon, silyl or germyl substituent on the dopant atom D. Thus, in preferred embodiments, $R^1$ is $C_1$-$C_6$ alkyl, $C_6$-$C_{12}$ aryl or $C_7$-$C_{12}$ aralkyl (as described above), $SiH_3$, or $Si(SiH_3)_3$. In specific implementations, $R^1$ may be t-butyl or phenyl.

Typically, n' and m' are the same as n and m in the heterocyclosilane made by the present method, respectively, but in some cases, n' and m' may be different from n and m (see, e.g., copending U.S. application Ser. No. 10/789,317, filed on Feb. 27, 2004, the relevant portions of which are incorporated herein by reference). In one embodiment, the halogen source comprises $HX^1$ or $R^3(C=O)X^1$, where $X^1$ is a halogen (e.g., Cl or Br) and $R^3$ is alkyl, aryl, aralkyl, or H, although certain reagents, such as Group VA pentahalides (e.g., $SbX^1_5$), HOTf or $HX^1$ (alone at pressures significantly higher than 1 atm and/or temperatures significantly higher than ambient temperatures), may serve as both a Lewis acid and a halogen source. Typically, the haloheterocyclosilane has a formula $(AX^1_z)_n(DR^1)_m$, where n, m, A, z, $X^1$, D and $R^1$ are as defined above, and the halogenating step forms a haloheterocyclosilane of the formula $(AX^1_z)_n(DR^1)_m$, although one skilled in the art will recognize that the haloheterocyclosilane may also have a formula $(A(OTf)_z)_n(DR^1)_m$ (i.e., where $X^1$ is OTf).

In a preferred embodiment, the method comprises performing the halogenating step and the reducing step in a single reaction apparatus, without intermediate isolation or purification of the haloheterocyclosilane compound. In one implementation, the halogenation reaction and the subsequent hydro-dehalogenation reaction are performed consecutively in a single reaction vessel. Thus, the present method may further comprise adding the metal hydride to the reaction mixture containing the haloheterocyclosilane compound(s), without isolating or purifying the haloheterocyclosilane compound(s) before the metal hydride addition. An example of such a process is provided below. However, if desired, one may purify and/or isolate the haloheterocyclosilane by conventional methods (see, e.g., U.S. Pat. No. 6,517,911, the relevant portions of which are incorporated herein by reference).

Exemplary Halogenation Conditions

Thus, in one embodiment, the present method may comprise a first step of reacting a compound of the formula $(AR^5_z)_{n'}(DR^1)_{m'}$ with $HX^1$ and (optionally) a Lewis acid compound of the formula $M^3_pX^2_q$ to form a haloheterocyclosilane, where A, $R^5$, z, D, $R^1$ and $X^1$ are as described above, and n' and m' are as described above for n and m, respectively, but which may be the same as or different from n and m, respectively. In preferred embodiments, n' and m' are the same as n and m, respectively (in one implementation, n is 4 and m is 1), z is 2, A is Si, and/or D is P or B (in one implementation, D is P).

In various embodiments, $R^5$ is an aryl group (e.g., phenyl, naphthyl, anthracenyl, etc.) which may be substituted with alkyl (e.g., straight-chain or branched $C_1$-$C_6$ alkyl groups), alkoxy (e.g., straight-chain or branched $C_1$-$C_6$ alkoxy groups), aryl (e.g., $C_6$-$C_{10}$ aryl groups), aralkyl (where the aryl and alkyl constituents may be as described herein), halogen, dialkylamino (where the alkyl constituents may be as described herein) and/or nitro groups. In one alternative embodiment, when z is 2, for each A, one $R^5$ may be aryl and the other may be hydrogen. Thus, each $R^5$ may independently be a $C_6$-$C_{10}$ aryl group which may be substituted with one or more $C_1$-$C_6$ alkyl, $C_1$-$C_6$ alkoxy, $C_6$-$C_{10}$ aryl, $C_7$-$C_{10}$ aralkyl, halogen, di-$C_1$-$C_6$-alkylamino and/or nitro groups, and for each A where z is 2, one $R^5$ may be hydrogen. Preferably, $R^5$ is a phenyl group.

In one embodiment, the Lewis acid comprises a compound of the formula $M^3_pX^2_q$, where $M^3$ comprises a member selected from the group consisting of transition metals and Group IIIA elements (as described herein); p is 1 or 2; and/or q is any integer up to the number of ligand binding sites available on the p instances of $M^3$. Preferably, $M^3$ is a Group IIIA element, q is 3*p (i.e., if p is 1, q is 3, and if p is 2, q is 6), and $X^2$ is the same as $X^1$. Alternatively, $M^3$ may comprise Al, $X^2$ may be Cl or Br, and $HX^1$ may comprise HCl or HBr. In a preferred implementation, $HX^1$ is HCl and the Lewis acid of the formula $M^3_pX^2_q$ is $AlCl_3$.

The reaction to form the haloheterocyclosilane compound is generally conducted under rigorously dry conditions. For example, the solvent(s) and reagents in solid or liquid phase are generally purified, degassed and dried (in accordance with conventional techniques) prior to use. Gas phase reagents (e.g., $HX^1$ gas) are generally purchased in dry form, and techniques to preserve its dryness are generally employed when transferring the gas phase reagent(s) to the reaction vessel. Such gas phase reactants may be continuously added to the reaction vessel (e.g., by bubbling through the reaction mixture). The reaction to form the haloheterocyclosilane compound may be conducted at a temperature of from about −78° C. to about 200° C., from about −20° C. to about 150° C., or from about 0° C. to about 100° C., until the reaction is complete. In one implementation, the reaction is conducted at ambient temperatures (e.g., from 15° C. to 30° C.). The reaction to form the haloheterocyclosilane may be monitored (e.g., by FT-IR spectroscopy, gas phase chromatography, $^1$H or $^{13}$C or $^{29}$Si or $^{31}$P NMR spectroscopy, etc.) to determine completeness. In various embodiments, the reaction may be conducted for a length of time of from 1 to 48 hours, 2 to 24 hours, or 4 to 16 hours. On a scale involving about 50 mmol of silicon atoms, the reaction was conducted for a length of time of from 5 to 8 hours.

Generally, the solvents suitable for dissolving the heterocyclosilane described above are suitable for the reaction to form the haloheterocyclosilane compound(s). Typically, a catalytic amount of Lewis acid is used in the halogenation reaction. For example, the Lewis acid may be present in a ratio of from 1 to 500 mmol (or from 3 to 300 mmol, or from 5 to 100 mmol) per mole of A atoms in the compound of the formula $(AR^5_z)_n(DR^1)_m$. Alternatively, the Lewis acid may be present in a ratio of from 0.5 to 200 mmol (or from 1 to 100 mmol, or from 2 to 50 mmol) per mole of non-hydrogen $R^5$ substituents in the compound of the formula $(AR^5_z)_n(DR^1)_m$.
Exemplary Hydro-Dehalogenation Conditions Of course, the present method also comprises a reduction (or hydro-dehalogenation) of the haloheterocyclosilane with a metal hydride to form the present heterocyclosilane compound(s) (e.g., of the formula $(AH_z)_n(DR^1)_m$). The metal hydride may comprise a compound of the formula $M^1_aM^2_bH_cR^6_d$, where $M^1$ and $M^2$ are independently first and second metals; each $R^6$ in the metal hydride compound is independently a ligand bound to at least one of $M^1$ and $M^2$ by a covalent, ionic or coordination bond; at least one of a and b is at least 1; c is at least 1; and d is 0 or any integer up to one less than the number of ligand binding sites available on the (a+b) instances of $M^1$ and $M^2$. (In the context of the present invention, "hydro-dehalogenation" also refers to the replacement of a -OTf group with H.)

In typical embodiments, $M^1$ is at least one alkali and/or alkaline earth metal and $M^2$ is at least one of the transition metals and/or Group IIIA-IVA (Group 13-14) elements selected from the group consisting of boron, aluminum, gallium, indium, tin and lead. In such metal hydrides, the alkali metal may be selected from the group consisting of lithium, sodium, potassium, rubidium and cesium (preferably lithium, sodium and potassium); the alkaline earth metal may be selected from the group consisting of beryllium, magnesium, calcium, strontium and barium (preferably magnesium and calcium); the transition metal may be selected from the group consisting of yttrium, lanthanum, titanium, zirconium, vanadium, niobium, tantalum, chromium, molybdenum, tungsten, manganese, rhenium, iron, ruthenium, osmium, cobalt, rhodium, iridium, nickel, palladium and platinum (preferably titanium, zirconium, niobium, chromium, molybdenum, tungsten, rhenium, ruthenium, osmium, rhodium, iridium, palladium and platinum); and the Group IIIA-IVA element may be boron and/or aluminum (preferably aluminum). Thus, a suitable metal hydride of the formula $M^1_aM^2_bH_cR^6_d$ is sodium dihydrido-bis-(2-methoxyethoxy)aluminate.

In certain embodiments, d is 0, and the metal hydride comprises a compound of the formula $M^1_aM^2_bH_c$. Examples of such metal hydrides include lithium aluminum hydride, calcium aluminum hydride, and sodium borohydride. In further embodiments, b is 0, and $M^1$ is selected from the group consisting of alkali and alkaline earth metals (e.g., Li, Na, K, Rb, Be, Mg and/or Ca). Examples of such metal hydrides include lithium hydride, calcium hydride, and sodium hydride. Alternatively, a is 0, and the metal hydride comprises a compound of the formula $M^2_bH_cR^6_d$. In such metal hydrides, $M^2$ may comprise at least one Group IIIA-IVA element selected from the group consisting of boron, aluminum, tin and lead, d is at least 1 but less than 3*b (in the case where $M^2$ is a Group IIIA element) or less than 4*b (in the case where $M^2$ is a Group IVA element); and each occurrence of $R^6$ is independently an alkyl group (e.g., a $C_1$-$C_6$ alkyl group), an alkoxy group (e.g., a $C_1$-$C_6$ alkoxy group), an alkoxyalkylene group (e.g., a $C_1$-$C_4$ alkoxy-$C_1$-$C_6$ alkylene group), an alkoxyalkyleneoxy group (e.g., a $C_1$-$C_4$ alkoxy-$C_1$-$C_6$ alkyleneoxy group), or a cyano group. Examples of suitable metal hydrides of the formula $M^2_bH_cR^6_d$ include dialkylaluminum hydrides such as diisobutylaluminum hydride (DIBAL).

In some embodiments, a and b are each an integer of at least one, $M^1$ comprises an alkali or alkaline earth metal, and $M^2$ comprises one or more members selected from the group consisting of transition metals, Group IIIA elements, tin (Sn) and lead (Pb). Preferably, in such metal hydrides, d is 0 (i.e., the metal hydride has a formula $M^1_aM^2_bH_c$), $M^1$ comprises an alkali metal, and $M^2$ comprises one or more Group IIIA elements selected from the group consisting of boron, aluminum, gallium and indium. Examples of suitable metal hydrides of the formula $M^1_aM^2_bH_c$ include lithium aluminum hydride, calcium aluminum hydride, and sodium borohydride. Alternatively, the metal hydride may comprise a compound of the formula $M^2_bH_c$. Examples of such metal hydrides include aluminum hydride, gallium hydride, and aluminum borohydride ($AlB_3H_{12}$).

Thus, in various embodiments, (i) $M^2$ comprises a member selected from the group consisting of transition metals, Group IIIA elements (as described above), Sn and Pb, a is 0 or 1, d is at least 1, and $R^6$ is an alkyl group, an alkoxy group, an alkoxyalkylene group, an alkoxyalkyleneoxy group or a cyano group (preferably $M^2$ comprises aluminum, $R^6$ is a $C_1$-$C_6$ alkyl group, and c and d are integers having a ratio of from 1:2 to 2:1); or (ii) a is 1 and $M^1$ comprises an alkali metal, each $R^6$ is independently a $C_1$-$C_6$ alkyl group, a $C_1$-$C_6$ alkoxy group, a di-$C_1$-$C_4$ alkylamino-$C_1$-$C_6$ alkylene group, a $C_1$-$C_4$ alkoxy-$C_1$-$C_6$ alkylene group, $C_1$-$C_4$ alkoxy-$C_1$-$C_6$ alkyleneoxy group, or a di-$C_1$-$C_4$ alkylamino-$C_1$-$C_6$ alkyleneoxy group, and c and d are integers having a ratio of from 1:3 to 3:1.

Alternatively, the metal hydride may be generated or created in situ during catalytic hydro-dehalogenation using a transition metal catalyst. In such a case, the transition metal may be selected from those described above, and $R^6$ may be selected from monodentate ligands (e.g., a trialkyl amine such as trimethyl or triethyl amine, a trialkyl phosphine such as trimethyl or triethyl phosphine, a triaryl phosphine such as triphenyl phosphine, CO, pyridine, CN, a halogen such as Cl, OH, an oxo group [=O], etc.), bidentate ligands (e.g., diethers such as dimethoxyethane, diamines such as 1,2-bis (dimethylamino)ethane or bipyridine, etc.), and polydentate ligands (such as cyclopentadienyl, pentamethylcyclopentadienyl, benzene, etc.). Typically, such catalytic hydro-dehalogenation are performed under a medium to high pressure of hydrogen gas (e.g., from a few atm to many tens of atm; e.g., from 3 to 100 atm, or from 5 to 50 atm), and at a temperature of from ambient temperature (e.g., from about 15° C. to about 30° C.) to several hundred degrees (e.g., up to 100° C., 150° C., or 200° C.).

Generally, the metal hydride is added to a solution of haloheterocyclosilane at a temperature of from −78° C. to about 200° C. (preferably from about −20° C. to about 100° C., more preferably from about −10° C. to about 30° C.), depending on the solvent and the reactivities of the haloheterocyclosilane compound(s) and the metal hydride, then the reaction mixture is stirred until the reaction is substantially complete. In various embodiments (except where the metal hydride is generated in situ using a catalytic amount of a metal hydride precursor), a solution of the metal hydride may be added to a solution of haloheterocyclosilane over a period of time of from 1 minute to 10 hours, 5 minutes to 4 hours, or 10 minutes to 2 hours, and/or at a rate of from 1 to 100 mmol of metal hydride/minute, 3 to 50 mmol/minute, or 5 to 25 mmol/minute. In one implementation (on a scale of about 10 mmol of haloheterocyclosilane), a solution of metal hydride is added at an initial temperature of −78° C. to about 20° C. (preferably from about −20° C. to about 10° C., more preferably from about −10° C. to about 0° C.), and after the addition is complete, the reaction mixture is then warmed to a second temperature higher than the initial temperature (e.g., from about 0° C. to about 100° C., more preferably from about 15° C. to about 30° C.). The reaction may be monitored (e.g., by FT-IR spectroscopy, gas phase chromatography, $^1$H or $^{13}$C or $^{29}$Si or $^{31}$P NMR spectroscopy, etc.) until the reaction is complete. This total reaction time may be from 10 minutes to 2 days, 1 to 24 hours, or 4 to 16 hours. The molar ratio of hydrogen atoms in the metal hydride to X groups (e.g., halogen atoms) in the heterocyclosilane can be from 5:1 to about 1:1, and is preferably about 2:1 (e.g., from about 1.9:1 to about 2.1:1).

Exemplary solvents for the metal hydride reduction reaction include alkanes (e.g., $C_5$-$C_{12}$ branched or unbranched alkanes and cycloalkanes), fluorinated alkanes (e.g., $C_3$-$C_8$ alkanes having from 1 to 2n+2 fluorine substituents and $C_3$-$C_6$ cycloalkanes having from 1 to 2n fluorine substituents, where n is the number of carbon atoms), arenes (e.g., benzene), substituted arenes (e.g., N-methylpyrrole or $C_6$-$C_{10}$ arenes having from 1 to 8 fluorine substituents and/or $C_1$-$C_4$ alkyl and/or alkoxy substituents; preferably benzenes having from 1 to 6 fluorine, $C_1$-$C_2$ alkyl and/or methoxy substituents), aliphatic ethers (e.g., ethers having two $C_2$-$C_6$ branched or unbranched alkyl groups, or 1 methyl group and one $C_4$-$C_6$ branched or unbranched alkyl group), cyclic ethers (e.g., tetrahydrofuran or dioxane), and glycol ethers (e.g., of the formula $(CH_3(CH_2)_w)O((CH_2)_xO)_y(CH_2)_zCH_3)$, where x' is independently 2-4 [preferably 2], y' is 1-4 [preferably 1 or 2], and w and z' are independently 0 to 3 [preferably 0]). The solvent selected for dissolving the haloheterocyclosilane compound(s) may be the same as or different from the solvent selected for dissolving the metal hydride. A preferred solvent for dissolving the haloheterocyclosilane is cyclohexane, and a preferred solvent for dissolving the metal hydride is diethyl ether.

Exemplary Isolation and/or Purification Steps

The present method may further comprise the step of purifying and/or isolating the heterocyclosilane. Such purifying and/or isolating typically comprises removing most of the solvent from the reaction mixture until two phases form, and separating the two phases (e.g., using a separatory or addition funnel); typically, the upper phase comprises the heterocyclosilane. The isolating and/or purifying may further comprise removing the remainder of the solvent. Alternatively, isolating and/or purifying may comprise distilling the heterocyclosilane, optionally under reduced pressure (e.g., from 0.1 to 50 Torr) and/or at ambient temperature or higher (e.g., from about 15° C. to about 90° C., or from about 20° C. to about 60° C.).

The present method may further comprise, following the metal hydride reduction, washing the heterocyclosilane (e.g., with an aqueous washing composition). The washing step is disclosed in copending U.S. application Ser. No. 10/789,317, filed on Feb. 27, 2004 (the relevant portions of which are incorporated herein by reference), and may contribute to reductions in metal impurities. In various embodiments, the washing composition comprises or consists essentially of deionized water or a saline solution (e.g., brine). Preferably, the washing composition consists essentially of deionized water. Thus, in one embodiment, the present method further comprises washing the heterocyclosilane compound with a washing agent.

The method may further comprise, after the washing step, the step of drying the (washed) heterocyclosilane compound. Typically, drying comprises contacting the heterocyclosilane compound with a drying agent or desiccant, such as molecular sieves, anhydrous sodium or magnesium sulfate, anhydrous silica, etc., or exposing the heterocyclosilane compound to a drying agent or desiccant, such as $CaCl_2$, $CaSO_4$ or perhaps even $P_2O_5$ that is physically separated from the heterocyclosilane compound (for example by placing the drying agent in one section of a two-walled flask or container and the heterocyclosilane compound in the other section, then sealing the flask or container and optionally purging the atmosphere to put the drying agent and heterocyclosilane compound under a vacuum or an inert atmosphere).

An Alternative Process for Making Heterocyclosilanes

The invention also concerns a method of making a heterocyclosilane that combines the above-described method of making a heterocyclosilane with the present method of making a heterocyclosilane precursor as described herein below. Thus, the present method of making a heterocyclosilane may comprise (i) the present method of making a heterocyclosilane precursor (as described herein); (ii) reacting the heterocyclosilane precursor with $HX^1$ or $R^3(C=O)X^1$ and (optionally) a Lewis acid to form a haloheterocyclosilane, where $X^1$ is a halogen or a trifluoromethanesulfonate (-OTf) group; and (iii) reducing the haloheterocyclosilane with a metal hydride to form the heterocyclosilane.

The present heterocyclosilane compound(s) may therefore be synthesized by (a) reducing and/or oligomerizing a compound of the formula $AR^5_2X_2$ (where $R^5$ is as described herein, e.g., aryl [such as phenyl or tolyl], H or alkyl [such as methyl, ethyl, propyl, isopropyl, n-butyl, s-butyl, t-butyl, cyclohexyl, etc.], and X is, e.g., a halogen) and cyclizing the reduced/oligomerized compound with a dopant precursor that introduces a —($DR^1$)- group into the cyclic ring, followed by (b) treating the reduced and/or oligomerized heterocyclic compound with a mixture of a Lewis acid and either a hydrogen halide or $R^3(C=O)X^1$, such as $AlCl_3$ and either HCl gas or $CH_3(C=O)Cl$ (e.g., when $R^5$ is aryl), or $SbX_5$-based systems (e.g., when R is alkyl), to form a corresponding haloheterocyclosilane, then (c) reacting the haloheterocyclosilane with a metal hydride to produce the heterocyclosilane (e.g., of the formula $(AH_z)_n(DR^1)_m$). Alternatively, the reduced and/or oligomerized heterocyclic compound may be reacted with HOTf or HX (e.g., HBr under high pressure, e.g., in a Parr vessel) without using any catalyst to form the haloheterocyclosilane.

Exemplary Heterocyclosilane Intermediates Useful for Making the Present Heterocyclosilanes A further aspect of the present invention relates to heterocyclosilane intermediates of the formula $(AR_z)_n(DR^1)_m$, where n is from 2 to 12, m is 1 or 2, each of the n instances of A is independently Si or Ge, each of the n instances of z is independently 1 or 2, each of the n*z instances of R is aryl, alkyl or aralkyl (and for each A where z is 2, one R group may be hydrogen), each of the m instances of D is Sb, As, P or B, and each of the m instances of $R^1$ is alkyl, aryl, aralkyl, or $AR^2_3$, where $R^2$ is hydrogen, alkyl, aryl, aralkyl, or $A_yH_{2y+1}$ (where y is an integer of 1 to 4). As for the present heterocyclosilane(s), in preferred embodiments, A is Si, z is 2, m is 1, n is 4, $R^1$ is $C_1$-$C_6$ alkyl, $C_6$-$C_{12}$ aryl, $SiH_3$, or $Si(SiH_3)_3$ (more preferably t-butyl or phenyl), and D is P or B.

In the present heterocyclosilane intermediates, R may be $C_1$-$C_6$ alkyl (e.g., methyl, ethyl, propyl, isopropyl, n-butyl, t-butyl, n-hexyl or t-hexyl [3',3'-dimethylbutyl]), $C_7$-$C_{12}$ aralkyl (e.g., benzyl, 1,5-dimethylbenzyl, α,α-dimethylbenzyl, etc.), or a $C_6$-$C_{10}$ aryl group which may be substituted with alkyl (e.g., straight-chain or branched $C_1$-$C_6$ alkyl groups), alkoxy (e.g., straight-chain or branched $C_1$-$C_6$ alkoxy groups), aryl (e.g., $C_6$-$C_{10}$ aryl groups), aralkyl (where the aryl and alkyl constituents may be as described herein), halogen, dialkylamino (where the alkyl constituents may be as described herein) and/or nitro groups. Furthermore, where z is 2, one R group and for each A atom may be hydrogen. Thus, each R may independently be a $C_6$-$C_{10}$ aryl group which may be substituted with one or more $C_1$-$C_6$ alkyl, $C_1$-$C_6$ alkoxy, $C_6$-$C_{10}$ aryl, $C_7$-$C_{10}$ aralkyl, halogen, di-$C_1$-$C_6$-alkylamino and/or nitro groups. However, in typical implementations, either all R groups are the same, or each A atom has bound thereto two different R groups (i.e., the heterocyclosilane intermediate has a formula $(AR^7R^8)_n(DR^1)_m$, where $R^7$ is a first R group and $R^8$ is a second R group that differs from the first R group, and where one of $R^7$ and $R^8$ may be hydrogen). In one implementation, each R is phenyl.

The present heterocyclosilane intermediates are useful in methods of making heterocyclosilanes, as described above with regard to the present method(s) of making a heterocyclosilane.

Exemplary Methods for Making Heterocyclosilane Intermediates

The present invention further relates to a method of making a heterocyclosilane precursor, comprising the steps of (a) reacting a silane of the formula $AX^3_{4-z}R_z$ with a reducing agent and a dopant precursor of the formula $DX^4_2R^1$ to form a reaction mixture, where z is 1 or 2; A is Si or Ge; $X^3$ and $X^4$ are each independently a halogen; R is aryl, alkyl or aralkyl (and where z is 2, one R may be hydrogen); D is Sb, As, P or B; and $R^1$ is alkyl, aryl, or $AR^2_3$ (where $R^2$ is hydrogen, alkyl, aryl, aralkyl or $A_yH_{2y+1}$, $1 \leq y \leq 4$); and (b) isolating the heterocyclosilane precursor from the reaction mixture. Typically, the heterocyclosilane precursor has the formula $(AR_z)_n(DR^1)_m$, where n, m, A, z, R, D and $R^1$ are as defined above. Thus, each of R and $R^1$ may independently be a $C_6$-$C_{10}$ aryl group which may be substituted with one or more $C_1$-$C_6$ alkyl, $C_1$-$C_6$ alkoxy, $C_6$-$C_{10}$ aryl, $C_7$-$C_{10}$ aralkyl, halogen, di-$C_1$-$C_6$-alkylamino and/or nitro groups. Alternatively, $R^1$ is $C_1$-$C_6$ alkyl, $C_6$-$C_{12}$ aryl, $C_7$-$C_{12}$ aralkyl, $SiH_3$, or $Si(SiH_3)_3$. Preferably, R is a phenyl group, and/or $R^1$ is t-butyl or phenyl. Examples of suitable starting silane materials of the formula $AX^3_{4-z}R_z$ include $Ph_2SiCl_2$ and $PhSiHCl_2$, and suitable starting dopant precursor materials of the formula $DX^4_2R^1$ include $PhPCl_2$ and $(CH_3)_3CPCl_2$.

In this method, the reducing agent may comprise an alkali metal (as defined above) or an electron source. When the reducing agent comprises an alkali metal, it may be selected from the group consisting of lithium, sodium and potassium. In one implementation, the alkali metal is lithium. When the reducing agent comprises an electron source, the reacting step typically comprises electrochemically coupling the silane and the dopant precursor under conditions (such as applied electric field, solvent dielectric constant, electrolyte concentration, electrode dimensions, etc.) adapted for such electrochemical coupling.

In one embodiment, the reacting step comprises a first silane oligomerization substep and a second heterocyclization substep. The silane oligomerization substep may comprise oligomerizing a compound of the formula $AX^3_{4-z}R_z$ with a reducing agent to form a silane oligomer (e.g., a species of the formula $[(AR_z)_n]^{2-}$), and the heterocyclization substep may comprise adding the dopant precursor (e.g., a compound of the formula $DX^4_2R^1$) to the silane oligomer. Typically, $X^3$ and $X^4$ are independently a halogen. When z=2, this embodiment generally forms a monoheterocyclic compound of the formula $(AR_2)_nDR^1$, where n is from 3 to 5 (and predominantly, n is 4). Where z=1, polyheterocyclic compounds are formed (see, e.g., FIGS. 1D-1F, but in which R replaces H).

The reaction to form the heterocyclosilane precursor may be conducted at a temperature of from about −78° C. to about 200° C., from about −20° C. to about 150° C., or from about −5° C. to about 100° C., until the reaction is complete. In the two-substep embodiment described above, the starting material of the formula $AX^3_{4-z}R_z$ is added to a mixture or suspension containing the reducing agent at a first, relatively low temperature (e.g., from about −78° C. to about 30° C., preferably from about −20° C. to about 15° C.), then after the starting material addition is complete, the reaction temperature is raised to a second, relatively high temperature (e.g., from about 0° C. to about 100° C., preferably about 15° C. to about 30° C.) for a first period of time (e.g., from 30 minutes to 36 hours, 1 to 24 hours, or 2 to 18 hours). In one implementation, the silane starting material was added to a suspension of Li at ice bath temperatures (about 0-5° C.), then the reaction mixture was stirred for about 16 h at ambient temperature. Thereafter, the dopant precursor is added, and the reaction mixture is heated to a third temperature (from about 20° C. to about 150° C., preferably from about 35° C. to about 100° C., but typically the reflux temperature of the solvent, the preferred solvents generally having a boiling point of less than about 80 or 100° C.) for a second period of time sufficient to substantially complete the reaction. In various embodiments, the second period of time may be from 15 minutes to 24 hours, 30 minutes to 12 hours, or 1 to 8 hours, and the total reaction time may be from 1 to 48 hours, 2 to 36 hours, or 4 to 24 hours. On a scale involving about one-half mole of silicon atoms, the reaction was conducted for a length of time of about 20-21 hours. As for the reactions described above, the reaction to form the heterocyclosilane precursor may be monitored (e.g., by infrared or FT-IR spectroscopy, gas phase chromatography, $^1H$ or $^{13}C$ or $^{29}Si$ NMR spectroscopy, or if the reducing agent is insoluble, by visually observing its disappearance, etc.) to determine completeness.

Any of the solvents described above for dissolving the heterocyclosilane or metal hydride are suitable for the reacting step, except for those that may deprotonate in the presence of the reducing agent. Preferred solvents include alkanes (e.g., $C_5$-$C_{12}$ branched or unbranched alkanes and cycloalkanes), arenes (e.g., benzene), substituted arenes (e.g., benzenes having from 1 to 3 $C_1$-$C_4$ alkyl and/or alkoxy substituents; preferably benzenes having 1 or 2 $C_1$-$C_2$ alkyl and/or methoxy substituents), aliphatic ethers (e.g., ethers having two $C_2$-$C_6$ branched or unbranched alkyl groups, or 1 methyl group and one $C_4$-$C_6$ branched or unbranched alkyl group), cyclic ethers (e.g., tetrahydrofuran or dioxane), and glycol ethers (e.g., as described above). A particularly preferred solvent for the coupling reaction is tetrahydrofuran (THF).

Generally, the starting material of the formula $AX^3_{4-z}R_z$ is reacted with a slight molar excess of reducing agent (e.g., from 1.0 to 1.1 moles, and preferably from 1.001 to 1.05 moles) per mole of $X^3$ atoms in the starting material. After the reaction is complete, a small amount (e.g., from 0.1 to 100 ml, 0.5 to 50 ml, or 1 to 25 ml) of deionized and/or distilled water may be slowly and carefully added to the reaction mixture to quench the reaction, but typically, quenching is not necessary. The heterocyclosilane precursor may be purified and/or isolated by removing some, most or substantially all of the solvent (e.g., by vacuum evaporation), filtering if the reaction mixture includes a solid phase, or by decanting and/or separating with a separatory or addition funnel if the reaction mixture includes more than one liquid phase. The silicon-containing phase may be washed with water and dried (although this is typically not necessary and may not even be desirable). If the heterocyclosilane precursor has a sufficiently high melting point, it may be purified by recrystallization from a relatively non-polar solvent (e.g., an alkane, cycloalkane or arene solvent as described above).

In an alternative reacting step, the starting material of the formula $AX^3_{4-z}R_z$ and the dopant precursor of the formula $DX^4_2R^1$ may be added simultaneously to the mixture or suspension containing the reducing agent. This alternative reacting step may form heterocyclic compounds in which m=2 and in which both $DR^1$ moieties are in a common ring (see, e.g., FIGS. 1C and 1E, but in which R replaces H). One may balance the molar ratios of $AX^3_{4-z}R_z$ and dopant precursor to provide a desired heterocyclosilane precursor (i.e., in which n and m have somewhat predetermined values in the formula $(AR_z)_n(DR^1)_m$), but one may reasonably expect to obtain a somewhat statistical mixture of heterocyclosilane precursor compounds in such cases (i.e., where one obtains a mixture of heterocyclosilane precursor compounds in which the values of n and m vary according to a substantially statistical distribution, based on the relative amounts of $AX^3_{4-z}R_z$ and dopant precursor used, and to some extent on the value[s] of z). For example, in the reaction to form the corresponding perphenyl analog of the compound of FIG. 1D, one may react $SiPhCl_3$, $SiPh_2Cl_2$, and $PPhCl_2$ in a respective molar ratio of 4:1:1, but one should expect to find other polycyclic heterosilanes in the reaction product mixture. Also, in the reaction to form the corresponding perphenyl analog of the compound of FIG. 1E, one may react $SiPhCl_3$, $SiPh_2Cl_2$, and $PPhCl_2$ in a respective molar ratio of 2:2:1, but one may find other polycyclic heterosilanes in the reaction product mixture.

In addition to the processes described above, the present heterocyclosilanes and heterocyclosilane precursors may be made by following conventional methods, such as those described in, e.g., U.S. Pat. Nos. 4,554,180, 4,683,145, 4,820,788, 5,942,637, 6,503,570, 6,517,911 and 6,527,847, and in, e.g., Kumada, J. Organomet. Chem., 100 (1975) 127-138, Ishikawa et al., Chem. Commun., (1969) 567, Hengge et al., J. Organomet. Chem., 212 (1981) 155-161, Hengge et al., Z. Anorg. Allg. Chem., 459 (1979) 123-130, and Hengge et al., Monatshefte für Chem., 106 (1975) 503-512, the relevant portions of which are incorporated herein by reference. Furthermore, the methods disclosed in any one of these references may be modified as suggested and/or disclosed in another of these references. However, the preferred method comprises oligomerizing $ARX_3$ and/or $AR_2X_2$ (where R is, e.g., phenyl and X is, e.g., Cl) and cyclizing the oligomerized silane with $DR^1X_2$, followed by treating with a mixture of a Lewis acid and either a hydrogen halide or $R^3(C=O)X^1$, such as $AlCl_3$ and either HCl gas or $CH_3(C=O)Cl$, to form a corresponding haloheterocyclosilane compound, then reducing the haloheterocyclosilane with a metal hydride (such as lithium aluminum hydride) to form a mixture of mainly c-$(AH_2)_nDR^1$, where n is from 3 to 5 (and is predominantly 4).

EXAMPLES

Synthesis of Nonaphenylcyclophosphatetrasilane

In a 3 L three-neck round bottom flask fitted with addition funnel, a reflux condenser and thermocouple, 9.2 g (1.32 mol) Li ribbon (Aldrich, 0.38 mm thick, cut into small pieces under argon) are suspended in 0.5 L of dry THF (tetrahydrofuran). Under vigorous stirring, 133 g (0.53 mol) $Ph_2SiCl_2$ (Aldrich) is added to this suspension at a rate that allows for complete addition after 60 to 80 minutes. The reaction mixture is kept between 0° C. and 5° C. during the addition of $Ph_2SiCl_2$ by ice-bath. After the addition is complete, the reaction solution is allowed to warm up to room temperature. Additional stirring for 16 hrs produces a yellow to red colored suspension. 24.5 g (0.14 mol) $PhPCl_2$ is then added to the suspension dropwise under vigorous stirring at 0° C. After the addition of $PhPCl_2$, the reaction mixture is heated to reflux for 3 hrs. In order to remove LiCl, the solvent is first removed from the reaction mixture under reduced pressure, then 1.5 L toluene is added to the resulting solid. The mixture is shaken or stirred vigorously, then the remaining solid is removed by filtration under Ar. The filtrate is dried under reduced pressure to obtain 95 g yellowish solid. Recrystallization from toluene gives 42 g white solid as final product. The structure of the final product is identified and/or confirmed by NMR and elemental analysis. Elemental analysis, Calc. for $C_{54}H_{45}PSi_4$: C 77.46, H 5.42, P 3.695, Si 13.42. Found: C 77.27, H 5.21, P 3.79, Si 13.57. 1H NMR $\delta_D$ ($C_6D_6$): 7.35 (m, 2 H), 7.28 (d, 16 H), 7.17 (m, 1H), 7.11 (t, 8H), 7.04 (m, 2 H), 6.92 (m, 16H). 31P{H} NMR $\delta_D$ ($C_6D_6$): 120.1.

Synthesis of Phenylcyclophosphatetrasilane

In a 1 L 4-neck flask equipped with addition funnels, a thermometer and a gas dispersion tube, 10 g of nonaphenyl-cyclophosphatetrasilane obtained as described above and 0.3 g freshly sublimed $AlCl_3$ are suspended in 200 ml of dry toluene. Under vigorous stirring, dry HCl gas is bubbled through this suspension at ambient temperature until an almost colorless to yellow solution is obtained. Under continuous HCl bubbling, the solution is stirred for 5-8 hrs.

50 mL of a 1M ethereal solution of $LiAlH_4$ (Aldrich) is added under vigorous stirring to the toluene solution at 0° C. The resulting suspension is further stirred at room temperature for another 15 hrs after the addition. Two phases are formed upon removing 150 ml solvent under reduced pressure. The lower phase containing precipitated byproduct is removed with a separatory funnel to yield about 125 ml of a clear solution. The solvents are further removed under reduced pressure. The product is purified by re-condensation to afford 0.5 ml clear colorless liquid (40% yield).

1H-NMR, 29Si-NMR, 31P-NMR and GC/MS analysis of the liquid confirm that a mixture of hetero-cyclosilanes has been formed with phenylcyclophosphatetrasilane as the main component. Cyclopentasilane can be identified as a second component. Other silane species are formed as well as aromatic and aliphatic byproducts. 1H NMR $\delta_D$ ($C_6D_{12}$): 7.25 (d), 7.15 (3), 6.85 (t), 3.55 (s). 31P{H} NMR $\delta_D$ ($C_6D_{12}$): 126.1. 29Si NMR $\delta_D$ ($C_6D_{12}$): −107.7, −100.5.

CONCLUSION/SUMMARY

Thus, the present invention provides heterocyclosilane compounds of the formula $(AH_z)_n(DR^1)_m$, compositions (e.g., ink formulations) containing such compounds, heterocyclosilane precursor compounds of the formula $(AR_z)_n(DR^1)_m$, and methods of synthesizing such compounds and making such compositions. In the present compounds, n is from 2 to 12, m is 1 or 2, each of the n instances of A is independently Si or Ge, each of the n instances of z is independently 1 or 2, each of the n*z instances of R is aryl, alkyl or aralkyl (and for each A where z is 2, one R group may be hydrogen), each of the m instances of D is Sb, As, P or B, and each of the m instances of $R^1$ is alkyl, aryl, or $AR^2{}_3$, where $R^2$ is hydrogen, alkyl, aryl, or $A_yH_{2y+1}$ (where y is an integer of 1 to 4). The compounds and compositions are generally useful for making (e.g., by printing or spin-coating) doped semiconductor thin films. Thus, the present invention advantageously provides a means for obtaining commercial qualities and quantities of thin doped semiconductor films from a "doped liquid silicon" composition.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A cyclic compound of the formula $(AH_2)_n(DR^1)_m$, where n is from 3 to 7, m is 1 or 2, n+m is 4 to 8, each of the n instances of A is independently Si or Ge, each of the m instances of D is Sb, As, P or B, and each of the m instances of $R^1$ is $C_3$-$C_6$ branched alkyl, $C_6$-$C_{12}$ aryl, or $AR^2{}_3$, where $R^2$ is hydrogen or $A_yH_{2y+1}$ (where y is an integer of 1 to 4).

2. The compound of claim 1, wherein each A is Si.

3. The compound of claim 1, wherein m is 1.

4. The compound of claim 3, wherein n is 4.

5. The compound of claim 4, wherein $R^1$ is isopropyl, t-butyl, t-hexyl, phenyl, α-naphthyl, β-naphthyl, tolyl, xylyl, cymyl, t-butylphenyl, $SiH_3$, or $Si(SiH_3)_3$.

6. The compound of claim 5, wherein $R^1$ is t-butyl or phenyl.

7. The compound of claim 5, wherein $R^1$ is $SiH_3$ or $Si(SiH_3)_3$.

8. The compound of claim 1, wherein said compound is monocyclic.

9. The compound of claim 1, wherein n is 4.

10. The compound of claim 3, wherein D is P or B.

11. The compound of claim 1, wherein D is P or B.

12. The compound of claim 1, wherein $R^1$ is isopropyl, t-butyl, t-hexyl, phenyl, α-naphthyl, β-naphthyl, tolyl, xylyl, cymyl, or t-butylphenyl.

13. The compound of claim 12, wherein $R^1$ is t-butyl or phenyl.

14. A composition, comprising:
    a) the compound of claim 1; and
    b) a solvent in which said compound is soluble.

15. The composition of claim 14, wherein A is Si.

16. The composition of claim 14, wherein n is 4.

17. The composition of claim 14, wherein from 0.00001 to 50 vol % of said composition consists essentially of said compound.

18. The composition of claim 17, wherein from 0.001 to 35 vol % of said composition consists essentially of said compound.

19. The composition of claim 18, wherein from about 0.002 to 25 vol % of said composition consists essentially of said compound.

20. The composition of claim 14, comprising a silane compound of the formula $(A'H_x)_k$, where k is from 3 to 12, each of the n instances of x is 1 or 2, and each A' is independently Si or Ge.

21. The composition of claim 20, wherein from 0.00001 to 50 vol % of said composition consists essentially of said compound of the formula $(AH_2)_n(DR^1)_m$ and from 0.5 to 99.999 vol. % of said composition consists essentially of said silane compound of the formula $(A'H_x)_k$.

22. The composition of claim 21, wherein from 0.0001 to about 10 wt. % of said composition consists essentially of said compound of the formula $(AH_2)_n(DR^1)_m$ and from about 1 to 25 vol % of said composition consists essentially of said silane compound of the formula $(A'H_x)_k$.

23. The composition of claim 14, wherein said solvent is selected from the group consisting of alkanes, substituted alkanes, cycloalkanes, substituted cycloalkanes, arenes, substituted arenes, and (cyclic) siloxanes.

24. The composition of claim 14, wherein said solvent is selected from the group consisting of $C_6$-$C_{10}$ alkanes; $C_1$-$C_6$ alkanes substituted with from 1 to 2a halogen or from 1 to n $C_1$-$C_4$ alkoxy substituents; $C_6$-$C_{10}$ monocycloalkanes; $C_3$-$C_8$ monocycloalkanes substituted with from 1 to 2a $C_1$-$C_4$ alkyl or halogen substituents or from 1 to a $C_1$-$C_4$ alkoxy substituents; $C_{10}$-$C_{14}$ polycycloalkanes and partially hydrogenated polycycloarenes; siloxanes of the formula $(R^3{}_3Si)(OSiR^3{}_2)_p(OSiR^3{}_3)$, where p is from 0 to 4, and each $R^3$ is independently H, $C_1$-$C_6$ alkyl, benzyl or phenyl substituted with from 0 to 3 $C_1$-$C_4$ alkyl groups; cyclosiloxanes of the formula $(SiR^4{}_2O)_q$, where q is from 2 to 6, and each $R^4$ is independently H, $C_1$-$C_6$ alkyl, benzyl or phenyl substituted with from 0 to 3 $C_1$-$C_4$ alkyl groups; and $C_3$-$C_8$ fluoroalkanes substituted with from 1 to (2a+2) fluorine atoms, where a is the number of carbon atoms in the selected solvent.

25. The composition of claim 24, wherein said solvent is a $C_6$-$C_{10}$ monocycloalkane or a $C_{10}$-$C_{14}$ polycycloalkane.

26. The composition of claim 14, further comprising a surface tension reducing agent, a surfactant, a binder and/or a thickening agent.

27. A method of making the composition of claim 14, comprising the steps of:
    a) combining said cyclic compound with said solvent; and
    b) mixing said cyclic compound and said solvent to form a solution of said cyclic compound in said solvent.

28. The method of claim 27, wherein said solvent consists essentially of a member selected from the group consisting of $C_6$-$C_{12}$ monocycloalkanes; $C_3$-$C_8$ monocycloalkanes substituted with from 1 to 2a $C_1$-$C_4$ alkyl or halogen substituents or from 1 to a $C_1$-$C_4$ alkoxy substituents, where a is the number of carbon atoms in the cycloalkane ring; $C_{10}$-$C_{14}$ polycycloalkanes and partially hydrogenated polycycloarenes; siloxanes of the formula $(R^3{}_3Si)(OSiR^3{}_2)_p(OSiR^3{}_3)$, where p is from 0 to 4, and each $R^3$ is independently H, $C_1$-$C_6$ alkyl, benzyl or phenyl substituted with from 0 to 3 $C_1$-$C_4$ alkyl groups; cyclosiloxanes of the formula $(SiR^4{}_2O)_q$, where q is from 2 to 6, and each $R^4$ is independently H, $C_1$-$C_6$ alkyl, benzyl or phenyl substituted with from 0 to 3 $C_1$-$C_4$ alkyl groups; and $C_3$-$C_8$ fluoroalkanes substituted with from 1 to (2b+2) fluorine atoms and that are liquid at ambient temperatures, where b is the number of carbon atoms in the fluoroalkane.

29. The method of claim 28, wherein said solvent consists essentially of a $C_6$-$C_{10}$ monocycloalkane or a $C_{10}$-$C_{14}$ polycycloalkane.

30. The method of claim 27, wherein from 0.00001 to 50 vol % of said composition consists essentially of said cyclic compound.

31. The method of claim 30, wherein from 0.0001 to 25 vol % of said composition consists essentially of said cyclic compound.

32. The method of claim 27, comprising combining said cyclic compound with a cyclosilane compound of the formula $(A'H_z)_k$, where k is from 3 to 12, each of the k instances of A' is independently Si or Ge, and each of the k instances of z is independently 1 or 2.

33. The method of claim 32, wherein from about 1 to 100 vol % of said composition consists essentially of said cyclic compound and said cyclosilane compound.

34. The method of claim 33, wherein from 0.00001 to 50 vol % of said composition consists essentially of said cyclic compound and from 0.5 to 99.999 vol % of said composition consists essentially of said cyclosilane compound.

35. The method of claim 34, wherein from 0.0001 to 35 wt. % of said composition consists essentially of said cyclic compound and from about 1 to 25 vol % of said composition consists essentially of said cyclosilane compound.

36. The compound of claim 6, wherein $R^1$ is t-butyl.

37. The compound of claim 10, wherein D is P.

38. The compound of claim 10, wherein D is B.

39. The compound of claim 37, wherein $R^1$ is t-butyl or phenyl.

40. The compound of claim 39, wherein $R^1$ is t-butyl.

41. The compound of claim 38, wherein $R^1$ is t-butyl or phenyl.

42. The compound of claim 41, wherein $R^1$ is t-butyl.

43. The compound of claim 13, wherein $R^1$ is t-butyl.

44. The compound of claim 37, wherein $R^1$ is isopropyl, t-butyl, phenyl, or tolyl.

45. The compound of claim 38, wherein $R^1$ is isopropyl, t-butyl, phenyl, or tolyl.

46. The compound of claim 4, wherein $R^1$ is isopropyl, t-butyl, phenyl, or tolyl.

47. The compound of claim 9, wherein $R^1$ is isopropyl, t-butyl, phenyl, or tolyl.

48. The compound of claim 47, wherein $R^1$ is t-butyl or phenyl.

49. The composition of claim 14, wherein $R^1$ is isopropyl, t-butyl, phenyl, or tolyl.

50. The composition of claim 49, wherein $R^1$ is t-butyl or phenyl.

51. The composition of claim 16, wherein $R^1$ is isopropyl, t-butyl, phenyl, or tolyl.

52. The composition of claim 51, wherein $R^1$ is t-butyl or phenyl.

53. The composition of claim 20, wherein $R^1$ is isopropyl, t-butyl, phenyl, or tolyl.

54. The composition of claim 53, wherein $R^1$ is t-butyl or phenyl.

55. The composition of claim 22, wherein $R^1$ is isopropyl, t-butyl, phenyl, or tolyl.

56. The composition of claim 55, wherein $R^1$ is t-butyl or phenyl.

57. The composition of claim 14, wherein m is 1.

58. The composition of claim 57, wherein n is 4.

59. The composition of claim 58, wherein $R^1$ is isopropyl, t-butyl, phenyl, or tolyl.

60. The composition of claim 58, wherein $R^1$ is t-butyl or phenyl.

* * * * *